Aug. 18, 1953  D. H. QUINN  2,649,205
SPEED FILTER
Filed April 13, 1948
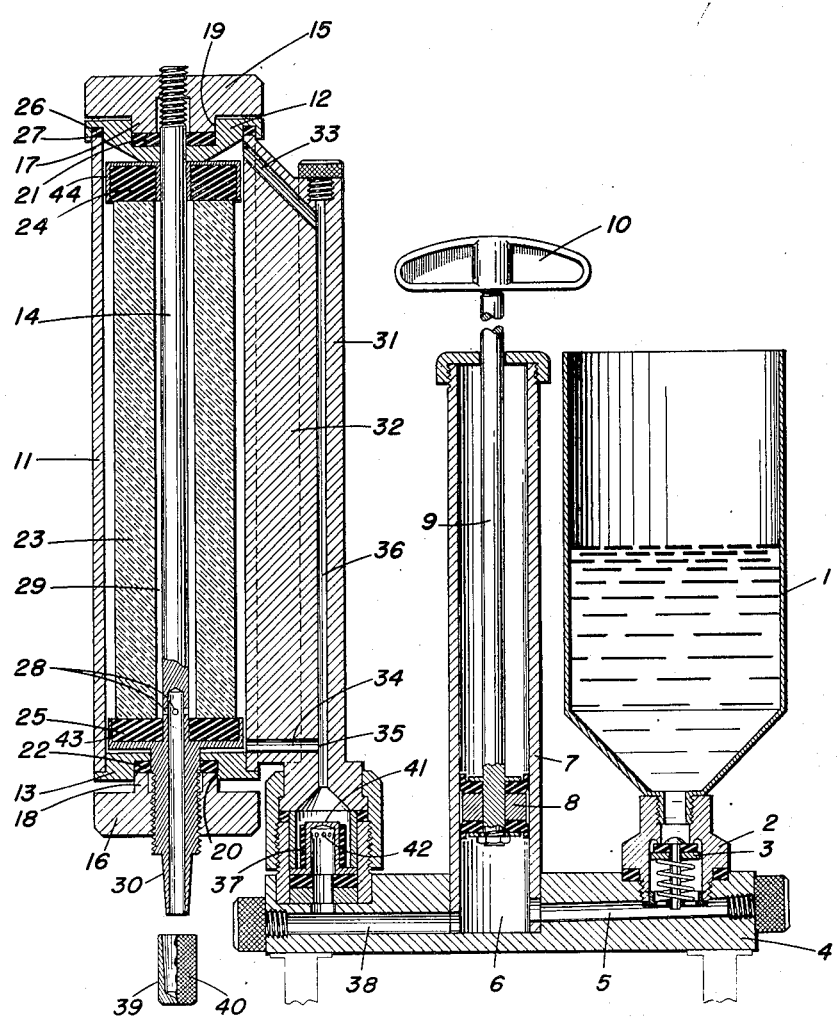
Inventor
DAVID H. QUINN
By F. J. Schmitt
Attorney Patented Aug. 18, 1953

2,649,205

UNITED STATES PATENT OFFICE 2,649,205

SPEED FILTER

David H. Quinn, Brookline, Mass., assignor to Quinn Products, Inc., Boston, Mass., a corporation of Massachusetts Application April 13, 1948, Serial No. 20,819

5 Claims. (Cl. 210—114)

(Granted under Title 35, U. S. Code (1952), sec. 266)

This invention relates generally to means for filtering fluids by forcing them through screens or screening material.

The object of this invention is to make an improvement in the ordinary filtering apparatus consisting normally of a reservoir for the dirty fluid, a pump, and a screen for filtering the fluid as it is pumped therethrough, the improvement being in the provision of a simple means for delaying the reduction in the capacity of the screen during the filtering process particularly for small amounts of fluid, which would normally occur as a result of the gradual clogging of the screens, commencing at points adjacent the more stagnant parts of the fluid in the screen chamber.

A further object is to eliminate the tendency to create stagnancy in any portion of the screen chamber above referred to, thereby causing all parts of the surface of the screen to clog equally and gradually, the entire screen surface remaining equally permeable throughout its life thus reducing filtering time, particularly for small amounts of critical laboratory fluids.

A further object in achieving this end is to provide a fluid transfer passage of comparatively small cross-sectional area leading from the pump to the screen chamber, whereby a high velocity of flow may be obtained with an accompanying reduction of static pressure at a by-pass port provided between the downstream end of the would-be stagnant part of the screen chamber and this high speed transfer passage, thus recirculating the dirty unfiltered fluid from places where the dirt would normally tend to accumulate and clog up the screen, back into the incoming stream of fluid into the screen chamber.

A more specific object is to provide a high speed flow of fluid between the pump and the screen chamber in a filtering system by making the transfer passage of a reduced cross-sectional area, and forming a fluid by-pass passage between the more stagnant portions of the screen chamber and this transfer passage for partial recirculation of the unfiltered fluid.

A further object is to construct a filtering unit comprising a container for the fluid to be filtered having an outlet check valve at its lowest point, a plunger pump, and a cylindrical screen chamber, all mounted on a common base, an inlet passage to said pump from said outlet check valve on said container, an outlet passage from said pump having a check valve connecting it to a transfer passage leading into said screen chamber, said transfer passage being of a small cross-sectional area compared to said pump plunger, whereby a comparatively high velocity of flow may be induced in said transfer passage during a pumping stroke, a tubular screen in said screen chamber annularly spaced from the wall of said chamber and sealed at its ends, a conduit from the inside of said tube extending thru the bottom of said chamber for the effluent, and a recirculating by-pass passage from the bottom of the annular space about said tubular screen to the transfer passage.

A further object is to construct said screen chamber and screen tube assembly so that the tube may be readily replaced whenever desired.

A further object is to construct said screen tube assembly so that it may be removed from and replaced in the chamber while all openings to the effluent side of the screen are sealed.

Other and more specific objects will become apparent in the following detailed description of one form of the filter system constructed in accordance with the present invention, having reference to the accompanying drawing, in which:

The single figure illustrates, partly in section, the arrangement of parts in the filtering unit herein to be described.

Referring to the drawing, the container 1 for the fluid to be filtered has a fitting 2 connected at its lowermost point and having an outlet check valve 3 therein. The fitting 2 may be threaded for screwing in a tapped portion of the base 4, so as to mount the container thereon for connection through the check valve 3 and the passage 5 in the base, to the pump chamber 6. The pump cylinder 7 is also mounted in the base 4 and has a plunger 8 with a rod 9 and handle 10 for manual operation.

A cylindrical screen chamber is formed by a cylinder 11 provided with end plugs 12 and 13, centrally bored for passing tie rod 14 therethrough. The rod 14 is threaded at both ends to receive knurled nuts 15 and 16. The nuts 15 and 16 have projecting bushings 17 and 18 respectively fitting in counterbores 19 and 20 of plugs 12 and 13, to compress sealing washers 21 and 22 therein to form leakproof packing joints between the plugs 12 and 13 and the rod 14, when the assembly is tightened over the ends of the cylinder 11.

The ceramic screen tube 23 is mounted in the assembly as shown between end sealing washers 24 and 25 clamped thereover between the seal pan 43 which is integral with rod 14 and the seal pan 44 under the plug 12 when the assembly is drawn together by the knurled nut 15. Sealing washers, such as 26, may be provided in grooves, such as 27, in the plugs for sealing the ends of the cylinder 11 when the nut 16 is drawn up tight. The lower plug 13 may be made separate or formed as a part of the lower end of cylinder 11. The lower end of the rod 14 is made hollow, and bores 28 in the walls of this hollowed portion connect the bottom of the annular space 29 around the rod inside the ceramic tube 23 to the inside of the rod, the exterior portion 30 of which is tapered and adapted to receive a rubber tubing for delivery of the effluent from the unit after it has been filtered. This screen tube assembly is replaceable as a unit in the present filtering device and is provided with a cap 39 for sealing the effluent outlet at the lower end of rod 14 by having a tapered fit thereover. Cap 39 may be knurled as shown at 40 for easy gripping when mounting or removing it. A number of these screen tube assemblies may be prepared by sterilizing them before replacing the caps 39 and placing them in storage for use as needed. To mount a screen tube assembly in the device, it is inserted through the top of cylinder 11 the lower plug 13, washer 22 and nut 16 being slipped over cap 39 and rod 14, and the nut 16 screwed up over the threaded portion until the screen chamber is sealed. Cap 39 is not removed until the operator is ready to use the filtering device.

The cylinder 11 is fixed to the tubular suction conduit 31 by a web 32 which has inlet conduit 33 and recirculation conduit 34 therein connecting the upper and lower portions of the screen chamber respectively with the upper end of suction conduit 31 and a port 35 in the side thereof for the purpose of recirculating a portion of the dirty fluid back into the conduit from around the part of ceramic tube which would normally have a tendency to clog up first by settlement of the dirt left behind as the fluid passes through the ceramic screen. The suction conduit 31 has a passage 36 of very small cross-sectional area compared to that of the pump plunger, whereby upon operation of the latter on its pumping stroke, a high velocity of flow may be obtained in the passage 36, so that the resulting low static pressure at port 35 will siphon the fluid from the screen chamber and recirculate it with the fluid coming directly from the pump into the top of the screen chamber. The principle of operation is broadly similar to that in injectors, aspirators, jet pumps and the like where advantage is taken of reduced pressures at points of high velocity in a fluid stream.

A check valve is provided in the transfer conduit connecting the pump chamber 6 to the outlet end of the casing between the passage 38 and the passage 36, and serves as the pump outlet valve. It is composed of an inverted cup member 41 having ports 42 in its sides covered by the upper end of a resilient sleeve 37, which opens the ports by stretching in response to fluid pressure produced inside the cup member by the downstroke of the pump plunger. Obviously, other forms of check valves and pumps might be used, altho the type illustrated has proven very satisfactory for dirty fluids. The resilient sleeve conforms easily to accommodate any particles of dirt that might lodge themselves under it between pump strokes, without causing valve leakage, which might occur if a reciprocating valve with a narrow seat were used.

The development of the present filter unit has reduced the time required to filter a small amount of dirty fluid such as contaminated water to a small fraction of the time required by previous devices of comparable size and has increased the efficiency of the process with respect to recovery of the fluid in the effluent to practically 100% in amounts over 50 cc. the filtering time required being only a matter of seconds as compared to many minutes or even hours required by other known means. In the operation of the present filtering device, even the last few drops of a liquid to be filtered, which would ordinarily be lost, are vaporized and may be forced through the screen as a vapor, which condenses on the inside walls of the receiving vessel for the effluent. In trial tests, with no especial effort and in a very short time, 10 cc. of influent was quickly converted into 9.8 cc. of effluent. It is important to observe that both the rate of inflow and the rate of recirculation of unfiltered liquid are dependent on the singular pressure of the pump source, thereby overcoming any tendency of the filter to clog and insuring uniformity in, and close control of, the filtered output.

Among the many uses for which this device is adaptable may be mentioned the sterilization of water and blood plasma. It may be used in a personal kit, in a laboratory or for commercial purposes, wherever a compact, efficient, self-contained and speedy filtering unit is desired.

Obvious modifications in the form and arrangement of parts may be made without departing from the spirit and scope of the present invention, as defined in the appended claims.

This invention may be manufactured and used by or for the United States Government without the payment of royalties thereon or therefor.

What is claimed is:

1. A filter casing for liquids comprising a tubular casing, a tubular filter inside said casing and displaced therefrom to form a receiving chamber for unfiltered liquid, an inlet to said chamber, seals for the ends of said filter, a first casing cap at one end of said casing, a tie rod extending through said cap and casing having a radial, impervious seal support inside the casing end opposite from the first cap, a second casing cap external to said rod seal support and penetrated by said tie rod, said tie rod being hollowed at the second cap end to form a conduit between the filter interior and the casing exterior, end nuts on said tie rod for binding the caps to the casing and the seals to the filter, and a cap for closing the tube end to said tie rod, whereby on assembly the filter may be first sterilized and then inserted in the casing without contamination.

2. In a filter unit, a pump having its inlet adapted for connection to a liquid reservoir, a tubular filter casing provided with a filtering element therein, said casing having an inlet for unfiltered liquid at its upper end and an outlet for filter effluent at its lower end, said filter element and casing being spaced to form a filter chamber for unfiltered liquid connected to said inlet, an unbranched transfer conduit for unfiltered liquid from the pump outlet to a point adjacent the outlet end of said casing, a suction conduit having a passage therein of cross-sectional area appreciably smaller than that of said filter chamber, said suction conduit having a side port therein and being connected to said casing inlet in series with said transfer conduit, and a recirculation conduit extending from the lower end of said chamber to said suction port for recirculating a part of the unfiltered liquid in said chamber from the outlet end to the inlet end thereof, said pump forming a single source of filter liquid.

3. A filter casing comprising an elongated tubular casing having an inlet port for liquid at one end thereof, an elongated tubular filter element inside said casing and forming therewith a chamber of limited capacity for inducted liquid, an outlet for said filter element at the other end of said casing, an unbranched suction conduit connected from said casing inlet to a point adjacent said casing outlet, said suction conduit having an enlarged inlet port, a side port and a cross-sectional area small relative to that of said casing chamber, and a recirculation conduit connected between said other end of said chamber and said suction conduit side port, whereby on supply of unfiltered liquid under pressure to the inlet port of said suction conduit unfiltered liquid from said chamber is recirculated from the outlet end to the inlet end thereof.

4. A filter casing comprising an elongated tubular casing having an inlet port for liquid at one end thereof, an elongated tubular filter element inside said casing and forming therewith a chamber of limited capacity for inducted liquid, an outlet for said filter element at the other end of said casing, an unbranched suction conduit connected from said casing inlet to a point adjacent said casing outlet, said suction conduit having an enlarged inlet port, a side port and a cross-sectional area small relative to that of said casing chamber, and a recirculation conduit connected between said other end of said chamber and said suction conduit side port, said filter casing including removable casing ends, a tie rod extending through said ends having one end hollowed with side ducts to form the filter outlet, seals for the ends of the filter, a nut threadedly fitted on each end of said rod for clamping said casing ends over said casing and seals, a removable cap for said rod outlet and an integral pan for the outlet and seal, whereby the nut at the casing end opposite to the outlet will tighten both seals and the casing end opposite to the outlet to form a filter assembly sealed against contamination at the outlet end when said cap is placed over said outlet.

5. In a liquid filter unit, a filter casing having an elongated filter element therein, said filter and casing being spaced to form an outer filter chamber for unfiltered liquid, an inlet for unfiltered liquid at one end of said casing, an outlet for filtered liquid at the other end of said casing, a single reservoir source of unfiltered liquid, a pump for forcing unfiltered liquid from said source through said casing, a transfer conduit between said pump and a point adjacent said casing, a suction conduit having a passage of cross-sectional area small relative to said chamber area connected in series between said casing inlet and said transfer conduit, and a recirculation conduit connected between said chamber adjacent the outlet end of said casing and a port in said suction conduit, whereby the rate of supply and recirculation of unfiltered liquid in said casing is subject only to the action of said pump.

DAVID H. QUINN.

References Cited in the file of this patent
UNITED STATES PATENTS

| Number | Name | Date |
|---|---|---|
| 384,306 | Bourdil | June 12, 1888 |
| 680,902 | Weaver | Aug. 20, 1901 |
| 691,706 | Long | Jan. 21, 1902 |
| 692,377 | Speer | Feb. 4, 1902 |
| 1,045,096 | Neil | Nov. 19, 1912 |
| 1,469,026 | Silvester | Sept. 25, 1923 |
| 1,800,066 | Glass | Apr. 7, 1931 |
| 2,249,681 | Briggs et al. | July 15, 1941 |
| 2,350,378 | Wallace | June 6, 1944 |

FOREIGN PATENTS

| Number | Country | Date |
|---|---|---|
| 26,857 | Great Britain | 1902 |
| 27,089 | Great Britain | 1908 |